United States Patent [11] 3,566,027

[72] Inventors T. O. Paine
Deputy Administrator of the National Aeronautics and Space Administration in respect to an invention of;
Robert Y. Wong, Monterey Park, Calif.
[21] Appl. No. 750,786
[22] Filed Aug. 7, 1968
[45] Patented Feb. 23, 1971

[54] VIDEO SIGNAL ENHANCEMENT SYSTEM WITH DYNAMIC RANGE COMPRESSION AND MODULATION INDEX EXPANSION
5 Claims, 10 Drawing Figs.

[52] U.S. Cl. .......... 178/7.1, 178/7.3
[51] Int. Cl. .......... H04n 5/14
[50] Field of Search .......... 325/46, 65; 178/6 (Gamma), 7.1 (AC), 7.5 (E), 7.3 (E), 6 (NS), 7.1; 332/37, 38

[56] References Cited

UNITED STATES PATENTS

| | | | |
|---|---|---|---|
| 2,932,691 | 4/1960 | Yule | 332/38 |
| 3,167,611 | 1/1965 | St. John | 178/5.4 |
| 3,288,930 | 11/1964 | Johnson | 325/46 |
| 3,305,627 | 2/1967 | Krause | 178/5.2 |
| 3,320,361 | 5/1967 | Stroh | 178/7.3 |
| 3,329,768 | 7/1967 | Wiencek | 178/7.5 |
| 3,333,055 | 7/1967 | Krause | 325/65 |
| 3,471,638 | 10/1969 | DeGroat | 325/65 |

*Primary Examiner*—Robert L. Griffin
*Assistant Examiner*—John C. Martin
*Attorneys*—J. H. Warden, M. F. Mott and G. T. McCoy

ABSTRACT: A video signal enhancement system is disclosed for enhancing the signal component representing the brightness of scene elements in a low contrast scene, wherein overall scene contrast is represented by a slowly varying DC component of an amptitude-modulated carrier frequency and the element brightness by one cycle of the carrier frequency. The system includes in addition to input/output and intermediate filters, an automatic signal range control circuit, which acts as a high pass filter to reduce the effect of the low frequency signal component.

INVENTOR.
ROBERT Y. WONG
BY J. N. Warden
G. McCoy
ATTORNEYS

*INVENTOR.*
ROBERT Y. WONG
*BY* J. H. Warden
H. McCoy
ATTORNEYS

Q1 Q2 Q3 Q4 = 2N930

D1 D2 D3 D4 D5 D6 = IN916

INVENTOR.
ROBERT Y. WONG
BY J. N. Warden
McCoy
ATTORNEYS

VIDEO SIGNAL ENHANCEMENT SYSTEM WITH DYNAMIC RANGE COMPRESSION AND MODULATION INDEX EXPANSION

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention generally relates to video information processing and, more particularly, to improvements in a video information-processing system designed to enhance video information which represents a low contrast scene.

2. Description of the Prior Art

Video signals, such as those typically generated by a spacecraft-borne television system, which consists of a telescopic objective and an ultraslow scan vidicon, used to scan a scene of interest, are generally in the form of an amplitude modulated carrier signal. The video information is represented by the modulated envelope which is formed by the peaks of the carriers. Each picture element is represented by one cycle of the carrier signal.

Basically, the modulated carrier contains a slowly varying DC component which represents the average scene illumination, and a rapidly changing or high frequency component represents the change in brightness within the scene. Typically, the modulated signal is recorded in analogue form in the spacecraft for subsequent playback, when the information is transmitted to a ground receiver for interpretation or other use.

When the scene which is scanned is of low contrast, such as that anticipated for some of the planets, for example, Mars, the amplitude variation of the high frequency component of the modulated signal is very small, since the difference in brightness or illumination between adjacent scene elements is small. A danger exists that the combined tape recording and playback noise may completely obscure this high frequency component, which would result in the loss of the detailed features of the scanned scene. Thus, a need exists for a system which would enhance the high frequency component of such video signals prior to recording.

OBJECTS AND SUMMARY OF THE INVENTION

It is a primary object of the present invention to provide improvements in a video information-processing system.

Another object of the present invention is to provide an improved video information-processing system in which the information representing brightness of scene elements is enhanced.

A further object of the present invention is to provide a television signal enhancement system for enhancing video information, representing brightness changes within a scanned scene, before recording to prevent such information from becoming lost, due to system and recording noise.

Still another object of the present invention is to provide a system for enhancing video signals of the type generated in a spacecraft-borne television system which consists of a telescopic objective and an ultraslow scan vidicon, in which the video information is represented by an amplitude-modulated carrier signal.

These and other objects of the invention are achieved by providing a system comprising an input band-pass filter, an automatic signal range control circuit, a signal filter, a modulation index expander and an output low-pass filter. The function of the input band-pass filter is to prevent noise, outside of a passband which includes a carrier frequency and its two information-carrying sidebands, from passing through it. The automatic signal range control circuit acts as a high-pass filter to reduce the amplitude of the low frequency component of the modulated carrier, without affecting the high frequency amplitude modulation. Because of the reduction in the low frequency output of the automatic range control circuit, the signal range at the range control circuit output is greatly compressed.

The output of the automatic signal range control circuit is supplied to the modulation index expander, through a signal filter whose basic function is to attenuate second and higher harmonics of the carrier frequency that may have been generated by the signal range control circuit. The modulation index expander is used to increase signal modulation, which also results in an increase in the amplitude of the high frequency signal component relative to the carrier signal. In essence it expands the AC signal component. The output of the modulation index expander is then passed through an output low-pass filter whose basic function is to attenuate or filter out second or higher order harmonics of the carrier frequency which may have been generated in the modulation index expander.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
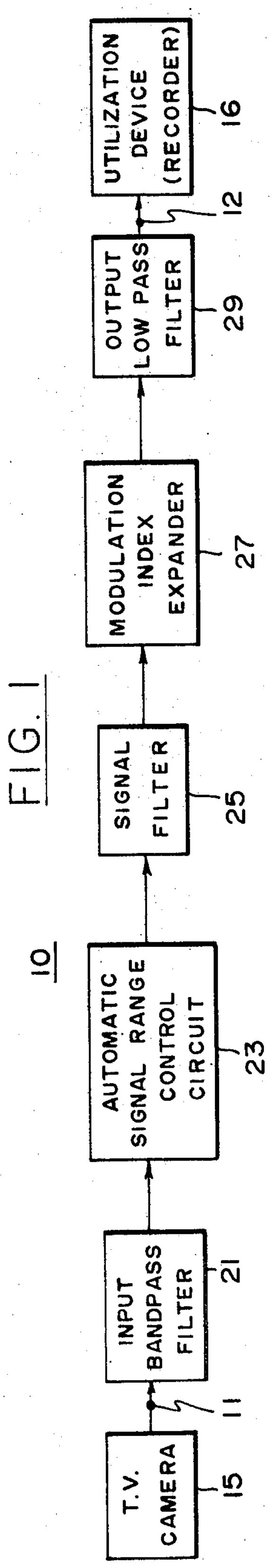
FIG. 1 is a simplified block diagram of the invention.

Reference is now made to FIG. 1 which is a block diagram of the novel video information enhancement system of the present invention, designated by numeral 10, and shown connected between an input terminal 11 and an output terminal 12. Terminal 11 is assumed to be connected to a source of video information which represents a low contrast scene, such as a space-borne TV unit 15. Output terminal 12 is assumed to be connected to a utilization device, such as a video signal recorder, which is designated by numeral 16.

The video information enhancement system consists of an input band-pass filter 21 which is supplied with the signals, received at input terminal 11. The input filter whose basic function is to attenuate or filter out noise outside a selected band-pass, which includes a modulated carrier signal and its two information-carrying sidebands, has its output connected to an automatic signal range control circuit 23. The function of circuit 23 is to act as a high pass or notch filter about the carrier frequency in order to attenuate low frequency components thereat.

Basically, circuit 23 acts as a signal compressor, substantially reducing the dynamic range of the input video information. Consequently, the output signal amplitude range which is presented to the recorder 16 is substantially reduced, to achieve linear recording thereof. To eliminate second and higher order harmonics of signals, which may be generated by circuit 23, from propagating through the enhancement system 10, a signal filter 25 is placed in the path of the output signals from circuit 23, which are directed to a modulation index expander 27. The function of expander 27 is to expand the signal modulation index, as well as the amplitude of the alternating current (AC) signal relative to the carrier signal. To prevent second and higher order harmonics, generated by expander 27, from reaching output terminal 12 and therethrough the recorder 16, the output of expander 27 is supplied to output terminal 12 through an output low-pass filter 29.

Figure 2:
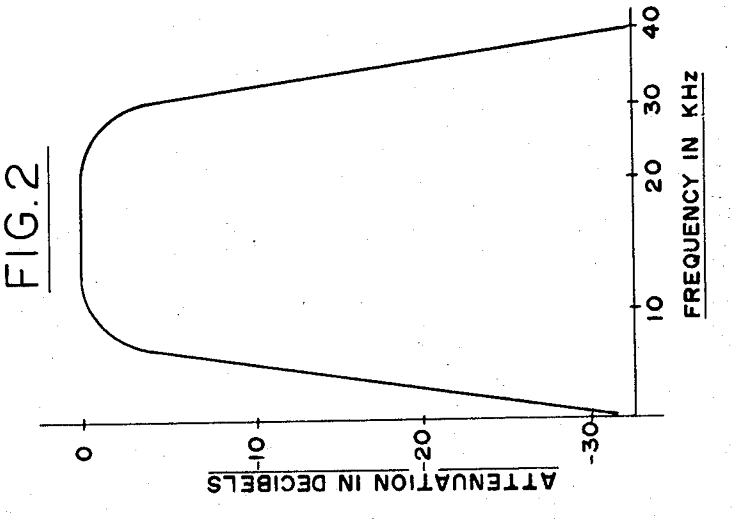
FIGS. 2 through 8 are curves which are useful in explaining the performance of various circuits, shown in block form, in FIG. 1.
Figures 3, 4:
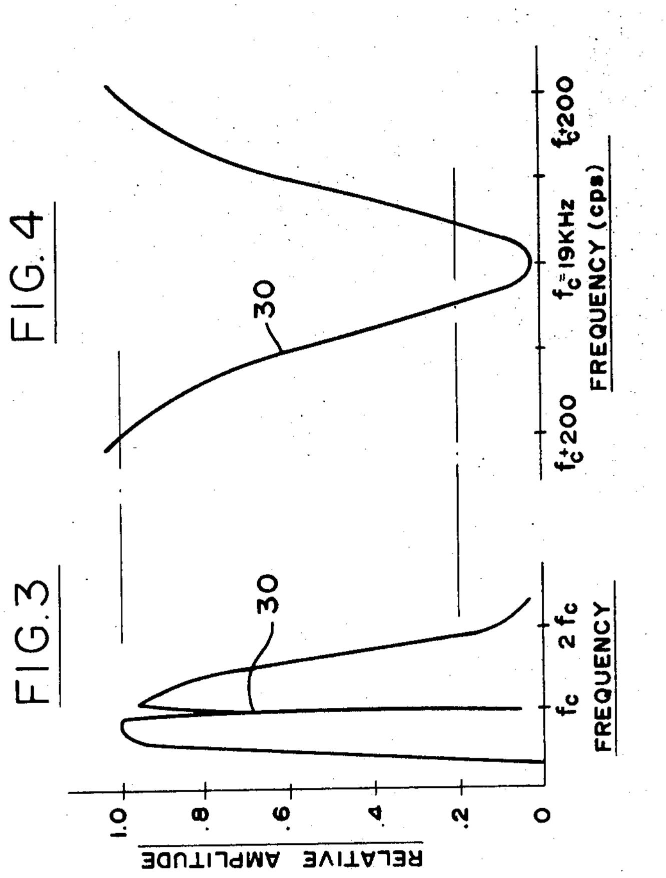
Figure 5:
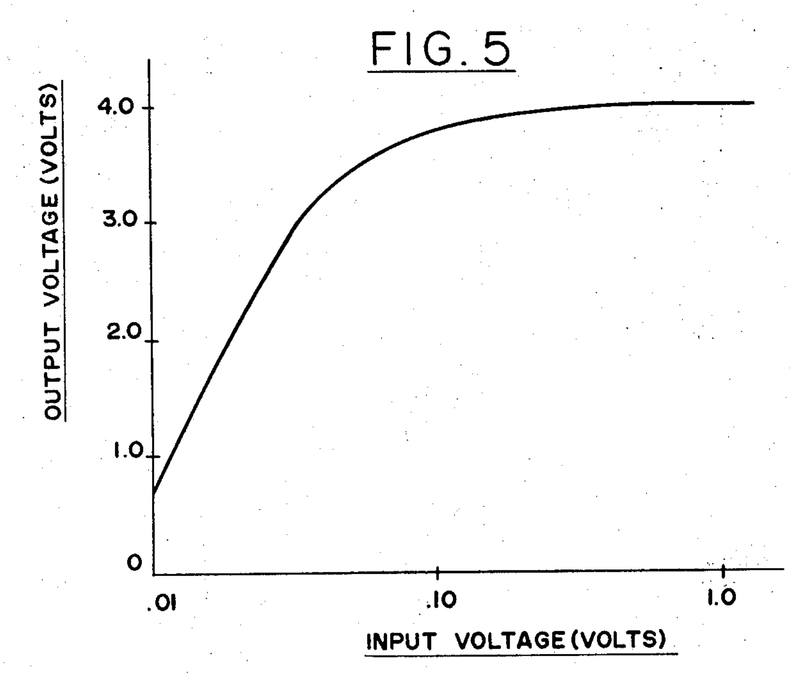
Figure 6:
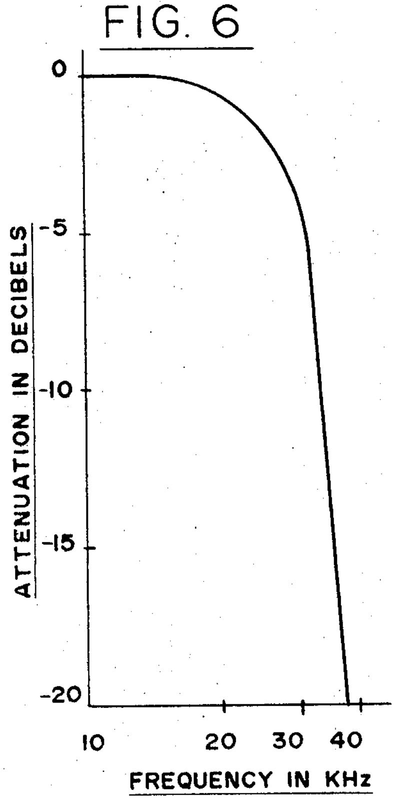
Figure 7:
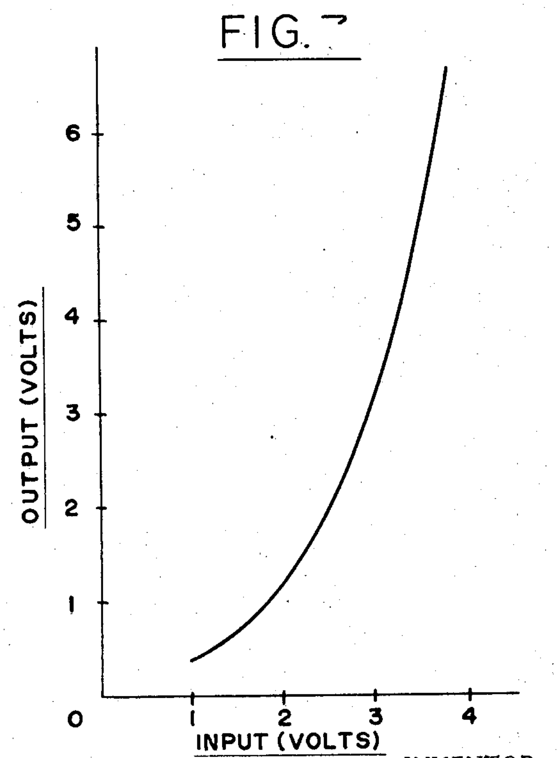
Figures 8, 9, 10:
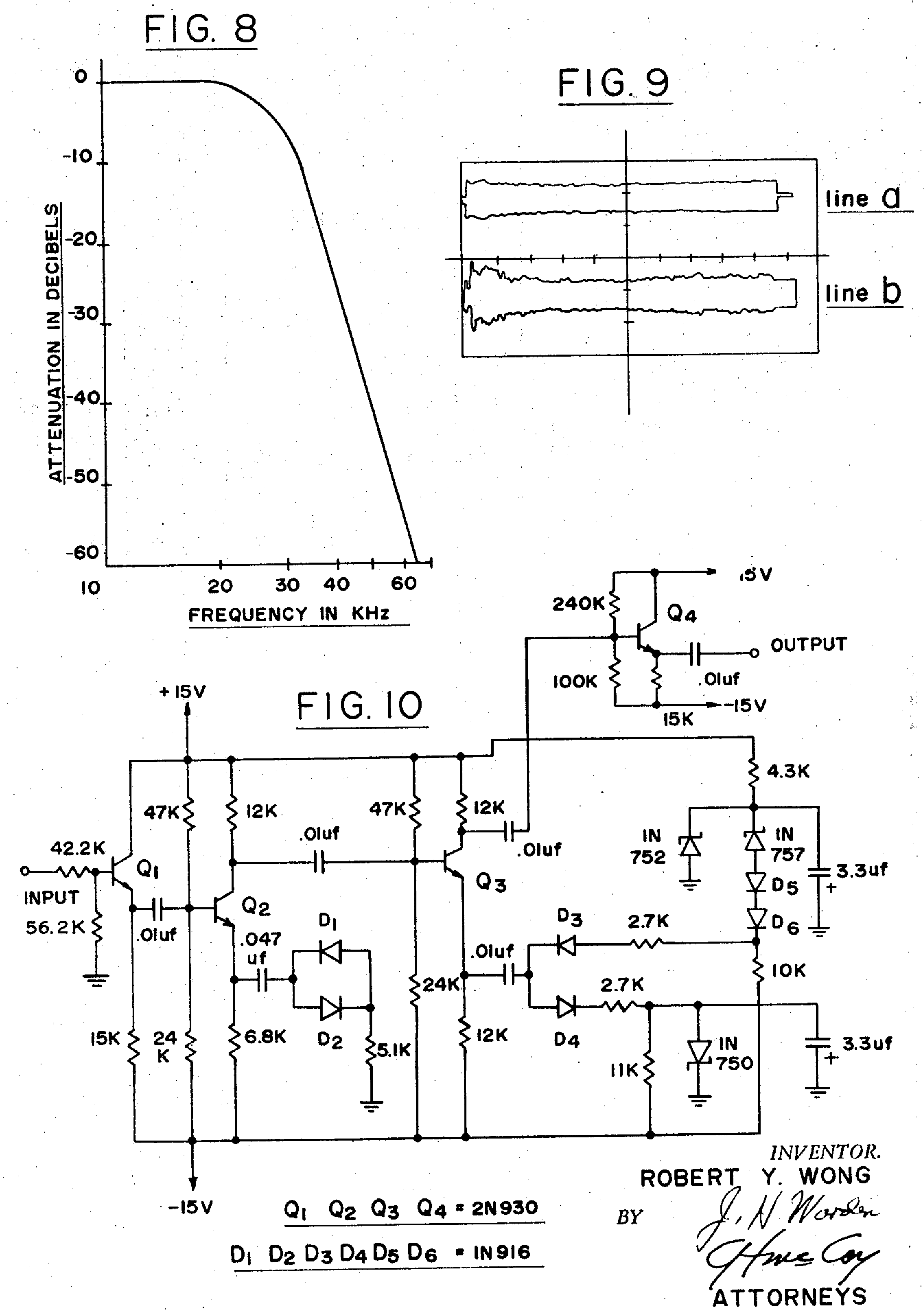
FIG. 9 is a multiline diagram of the waveforms of one example of input and output signals in conjunction with the present invention.
FIG. 10 is a schematic diagram of one embodiment of the modulation index expander, shown in FIG. 1.

The operations of the filters and circuits hereinbefore described, may better be explained in conjunction with FIGS. 2 through 8. FIGS. 2, 6 and 8 are curves representing the frequency attenuation characteristics of several of the filters, while FIGS. 3 and 4 represent the frequency transfer characteristics of the control circuit 23. FIGS. 5 and 7 are curves representing input/output characteristics of the control circuit 23 and modulation index expander 27, respectively. For explanatory purposes, it is assumed that the amplitude modulated carrier has a frequency of 19 kHz. with an upper sideband of 25kHz. and a lower sideband of 13kHz.

To accommodate the passband between at least 13kHz. and 25kHz., the input band-pass filter 21, is centered about the carrier frequency and has a sufficiently broad bandwidth to enable the carrier and its sidebands to pass therethrough, while attenuating noise signals above and below the frequency limits. The output of filter 21 is supplied to the control circuit 23, whose frequency characteristics are diagrammed in FIGS. 3 and 4. Basically, control circuit 23 attenuates the frequencies slightly above and below the carrier frequency *fc* while permitting the rest of the frequencies, passing through the filter 21, to propagate therethrough unaffected. Thus, circuit 23 may be thought of as either a high pass filter, or alternately as a notch filter about the carrier frequency *fc*. The notch is designated in FIG. 3 by numeral 30.

FIG. 4 represents an expanded view of the low frequency attenuation produced by the control circuit 23. The input/output characteristics of control circuit 23 are diagrammed in FIG. 5. Assuming an input signal range of 30 millivolts to 4 volts, the automatic signal range control circuit 23 compresses this range to provide an output range of 2.8 volts to 4 volts. Thus, a compression ratio of better than 3 is obtained. By compressing the wide dynamic range of the input video signal, output signal amplitude range which is presented to the recorder 16 is reduced significantly. By reducing the amplitude range of the signals, which are received by the recorder, linear signal recording is easily attained.

As is appreciated by those familiar with the art, the control circuit 23 operating as a notch filter may generate second and higher order harmonics of the carrier frequency. To inhibit such higher order frequencies from advancing through system 10, filter 25 is used. The frequency characteristics of the filter 25, operating as a low-pass filter, are diagrammed in FIG. 6. As seen therefrom, filter 25 passes frequencies up to and including the upper sideband of the carrier frequency, i.e., 25kHz., with substantially insignificant attenuation, while higher frequencies are greatly attenuated. Thus, any second or higher order harmonics of the carrier frequency which may have been generated in circuit 23, are inhibited from passing to the modulation index expander 27.

The input/output characteristics of the modulation index expander are diagrammed in FIG. 7. As an example to illustrate the expander's characteristics, a 10 percent modulated signal which contains an average signal amplitude of 3.0 volts and a high frequency component of 0.3 volt is supplied as input to expander 27. Such an input signal has an average, maximum envelope and minimum envelope amplitude of 3.0 volts, 3.3 volts and 2.7 volts, respectively. Expander 27 in turn provides an output of a 30 percent modulated signal which contains an average signal amplitude of 3.2 volts and a maximum and minimum envelope amplitude of 4.25 volts and 2.30 volts to form a high frequency component of 0.98 volts. Therefore, expander 27 produces an increase of the signal modulation by a factor of three.

The output of expander 27 is supplied to the recorder 16 through the output low-pass filter 29 whose frequency characteristics are diagrammed in FIG. 8. Actually, filter 29 is similar to filter 25 in that it acts as low-pass filter, permitting the carrier frequency and its two sidebands to pass therethrough with minimum of attenuation, while attenuating second and higher order harmonics of the carrier frequency.

Reference is now made to FIG. 9, wherein line *a* represents an example of a carrier-modulated signal of the type which may be applied at input terminal 11, while line *b* represents the enhanced output at output terminal 12. From a comparison of the two lines, it should be appreciated by those familiar with the art, that while the slowly varying DC component of the modulated signal, which represents the average scene illumination, is not materially affected, the high frequency component, which represents changes in brightness between one scene element and another, is greatly enhanced.

It should further be apparent to those familiar with the art that in light of the foregoing description, each of the circuits or filters, diagrammed in block form in FIG. 1, may be easily implemented with state of the art devices and techniques. Furthermore, the specific implementation would depend on the carrier frequency and its two information sidebands. One example of an embodiment of the modulation index expander 27 is shown in FIG. 10 to which reference is made herein. The specific example represents an actual reduction to practice of the expander, in which the modulation index of the output signal is expanded by a factor of three. The particular expander is designed to respond to an input signal range varying between approximately 2.6 volts and 4 volts, and supplying an output range varying between 2 volts to 8 volts.

Although particular embodiments of the invention have been described and illustrated herein, it is recognized that modifications and variations may readily occur to those skilled in the art and consequently it is intended that the claims be interpreted to cover such modifications and equivalents.

I claim:

1. In a video system of the type including a video camera for providing video signals in the form of amplitude-modulated carrier signals, said modulated signals defining a slowly varying direct current signal component, representing the average scene illumination, and a high frequency component, representing the change in illumination between scene elements, with each cycle of said carrier signals representing the brightness of an element with said scene, the system further including utilization means which utilize the video signals from said camera, the improvement comprising video signal enhancement means coupled between said camera and the utilization means and including automatic signal range control means for compressing the video signal range supplied to said video signal enhancement means, and modulation index-expanded means coupled to and responsive to the output of said automatic signal range control means for expanding modulated signals supplied thereto.

2. The video system as recited in claim 1 wherein, said enhancement means include an input band-pass filter coupled between the input of said enhancement means and said automatic range control means for inhibiting noise signals of frequencies above and below a selected band-pass which includes the carrier signal frequency and its sidebands, from affecting the operation of said enhancement means, said enhancement means further include an output low-pass filter coupled between said modulation index-expanding means and said utilization means for inhibiting high order harmonics of signals, generated in said enhancement means, from advancing to said utilization means.

3. In a video signal system wherein, the system responds to video signals in the form of amplitude-modulated carrier signals which represent a scene illumination, with a slowly varying direct-current signal component representing the average scene illumination, and the amplitude of each carrier signal represents the illumination of an element within the scene, a video signal enhancement system comprising:

input means responsive to said video signals and including range control means for compressing dynamic range of the video signals supplied thereto; and output means including modulation index-expanding means responsive to the video signals of reduced dynamic range, supplied thereto by said range control means for expanding the index of modulation of the modulated carrier signals prior to providing an output suppliable to video signal utilization means.

4. The video signal enhancement system as recited in claim 3 further including an input band-pass filter in said input means for minimizing noise signals of frequencies above and below the carrier frequency and its sidebands from affecting said range control means, and said output means further including a low-pass filter connected between said modulation index-expanding means and said utilization means for inhibiting high order harmonics of said carrier frequency, generated in said modulation index expander, from advancing to said utilization means.

5. The video signal enhancement system as recited in claim 4 further including a filter connected between said range control means and said modulation index expanding means for inhibiting high order harmonics of said carrier frequency which may be generated in said range control means from affecting said modulation index expanding means.